United States Patent [19]
Davidson et al.

[11] Patent Number: 5,613,157
[45] Date of Patent: Mar. 18, 1997

[54] ADDRESS RANGE EXTENSION FOR A MODULAR COMPUTER

[75] Inventors: Joel R. Davidson; Hehching H. Li; Franklin M. Liu, all of Austin, Tex.

[73] Assignee: International Business Machines Corporation, Armonk, N.Y.

[21] Appl. No.: 699,709

[22] Filed: Jun. 10, 1996

Related U.S. Application Data

[63] Continuation of Ser. No. 168,620, Dec. 17, 1993, abandoned.

[51] Int. Cl.$^6$ .......................... G06F 12/00; G06F 13/00
[52] U.S. Cl. .................... 395/828; 395/821; 395/280; 395/306; 395/840
[58] Field of Search ........................... 395/275, 325, 395/850, 821, 401, 304, 828, 840, 280, 306; 365/49

[56] References Cited

U.S. PATENT DOCUMENTS

| | | | |
|---|---|---|---|
| 4,213,177 | 7/1980 | Schmidt | 395/500 |
| 4,286,321 | 8/1981 | Baker et al. | 395/307 |
| 4,597,084 | 6/1986 | Dynneson et al. | 371/51 |
| 4,872,003 | 10/1989 | Yoshida | 340/825.08 |
| 4,945,512 | 7/1990 | DeKarske et al. | 365/49 |
| 5,237,567 | 8/1993 | Nay et al. | 370/85.1 |
| 5,247,657 | 9/1993 | Myers | 395/550 |
| 5,317,723 | 5/1994 | Heap et al. | 395/500 |
| 5,357,621 | 10/1994 | Cox | 395/400 |
| 5,390,129 | 2/1995 | Rhodes | 364/480 |
| 5,392,443 | 2/1995 | Sakakibara et al. | 395/800 |
| 5,404,464 | 4/1995 | Bennett | 395/325 |
| 5,434,982 | 7/1995 | Calzi | 395/325 |
| 5,490,253 | 2/1996 | Laha et al. | 395/304 |
| 5,490,263 | 2/1996 | Hashemi | 395/476 |

FOREIGN PATENT DOCUMENTS

| | | |
|---|---|---|
| 0020908A1 | 1/1981 | European Pat. Off. . |
| 0183273A3 | 6/1986 | European Pat. Off. . |
| 0419112A2 | 3/1991 | European Pat. Off. . |

OTHER PUBLICATIONS

*Signetics Philips Semiconductors*, Jan. 1992, "The I$^2$C–bus and How to Use it", pp. 1–23.

*Primary Examiner*—Christopher B. Shin
*Attorney, Agent, or Firm*—Casimer K. Salys

[57] ABSTRACT

A system and method for accessing a multiplicity of memory devices connected to a serial bus of defined protocol and which a direct memory device selection range smaller than the number of memory devices. The memory devices are divided among microcontrollers which selectively enable one or more memory devices responsive to higher level addressing signals sent to the microcontrollers. Thereafter, selectively enabled groups of memory devices are accessed by applying the limited addressing range of the serial bus. The invention finds particular use in modularized systems where cost and complexity are significant considerations by extending the normal range of the chip select function to increase the memory device count beyond the standard bus protocol. A preferred embodiment uses EEPROM devices and an I$^2$C protocol bus.

13 Claims, 3 Drawing Sheets

ADDRESS RANGE EXTENSION FOR A MODULAR COMPUTER

This is a continuation of application Ser. No. 08/168,620 filed Dec. 17, 1993 now abandoned.

BACKGROUND OF THE INVENTION

The present invention relates generally to the use of a serial bus in a modular computer. More particularly, the invention is directed to the use of a controller to extend the address range of a serial bus used to access memory devices in multiple modules of a computer system.

Recent trends in computer system designs suggest a strong preference for the use of parallel architectures and multichip configurations of computer processors and memory. Parallel processor computer architectures inherently introduced the concept of modular designs, namely designs which lend themselves to upgrades through the addition of modularized units. The concept of a modular and expandable computer system introduces the need for a system architecture which can recognize and manage changes to the number and type of the modules. In the context of such a multiprocessor system, the diversity of the modules can broadly encompass field replaceable processor, memory, I/O, power supply, or most any other computer units which can be modularized and easily interconnected.

The movement toward multiprocessor modular designs and field replaceability requires that the modules contain vital product information, such as data specifying the module type (e.g., processor versus memory), size and performance characteristics. Furthermore, experience has shown that the memory used to store vital product data can also be used to store other module related information, such as that representing an address relationship between the installed module and the multiprocessor system. Therefore, it is desirable to use electrically erasable programmable read-only memories (EEPROMs) in the modules subject to field replacement to store such vital product data and multiprocessor modular relationship unique data.

It is fairly well known that pin count limitations are major constraints for multichip modules. For this reason, the reading and writing of vital product and configuration data from the modules is preferably accomplished using a serial bus, requiring only a clock line and a data line.

As the number of modules in multiprocessor systems increase, so to do the number of memories units individually associated with the modules. A fully configured multiprocessor system may require as many as 75 modules, inherently requiring the selective and distinct addressing of 75 different memories.

One industry standard serial bus architecture which has evolved over many years to be well documented, frequently used and extensively supported by integrated circuit devices is the I²C bus. The particulars of the bus protocol are set forth in the document entitled "The I²C-Bus and How To Use It" (including specification) as appears in a Jan. 1992 publication by Signetics Division of Philips. The use of such an industry standard bus is clearly preferred over a completely new and proprietary serial bus for new multiprocessor systems.

The unfortunate deficiency of the I²C bus protocol lies in the fact that the chip select is accomplished in a seven bit word which by protocol definition assigns four of the seven bits to a designation of the device type. This protocol leaves the remaining three bits to select among the devices of that device type. For example, the protocol requires that the first four bits of an EEPROM type device select address have a specified binary combination, leaving the last three bits to make the chip selection. The problem with this protocol is that it does not allow differentiation among more than eight EEPROM devices on the I²C bus.

The I²C bus protocol does provide for the transmission and receipt of ten bit words. However, the ten bit word protocol requires intelligent processing at both the transmission and receiving ends of the communication path over the bus.

The dilemma is how to use a low cost and industry standard bus to select memory having vital product data in modules whose number count is greater than the selection range allowed by the bus protocol.

According to the present invention the bus address range limitation is solved in a modular computer using a memory access system comprising one or more first modules, the first modules having a first memory and an access control means interfaced to a bus, a plurality of second modules, the second modules having a second memory without access control means interfaced to the bus, and means for having the access control means regulate access from the bus both to first memory and to second memory responsive to intelligent signals on the bus. In another form, the invention is directed to a method for accomplishing the functions.

A preferred implementation of the present invention in a modular multiprocessor involves the use of an I²C bus to interconnect EEPROM devices which are individually enabled by power application or chip select using shared microcontrollers responsive to intelligent commands transmitted over the same serial bus. In the preferred implementation, each field replaceable module incorporates a EEPROM device for storing vital product data representative of that module. However, the enablement of the EEPROM device for purposes of reading or writing stored data is accomplished in response to a microcontroller which controls two or more EEPROM devices.

The microcontroller responds to extended length words on the serial bus to identify itself as the microcontroller managing access to a group of EEPROM devices. The microcontroller so addressed enables the associated EEPROM devices either by initiating a chip select or enabling power. Thereafter, conventional I²C protocol addressing selects the EEPROM device using the same serial bus. Accessing of the EEPROM device so identified permits not only conventional reading of vital product information, but programming/writing of information into the EEPROM for an EEPROM in a replacement module undergoing an initialization sequence.

The system and method of the present invention allow the use of an industry standard serial bus with conventional integrated circuit devices and microcontrollers to address devices greater in numerical count than the bus protocol provides. These and other features of the invention will be more clearly understood and appreciated upon considering the detailed description set forth hereinafter.

DESCRIPTION OF THE PREFERRED EMBODIMENT

The highly competitive nature of the contemporary computer system market place requires a careful balance between innovative new designs and innovative uses of industry standard designs and devices. This sensitivity to cost and convention is reflected in the present invention, through the use of the industry standard I²C serial bus to communicate among a multiplicity of processor, memory, I/O, and the like, modules used to form the multiprocessor system. As presently implemented, the invention permits the use of numerically greater EEPROM devices than is directly permitted by the bus protocol by using microcontrollers to selectively enable groups of EEPROM devices responsive to microcontroller specific instructions on the bus.

Figure 1:
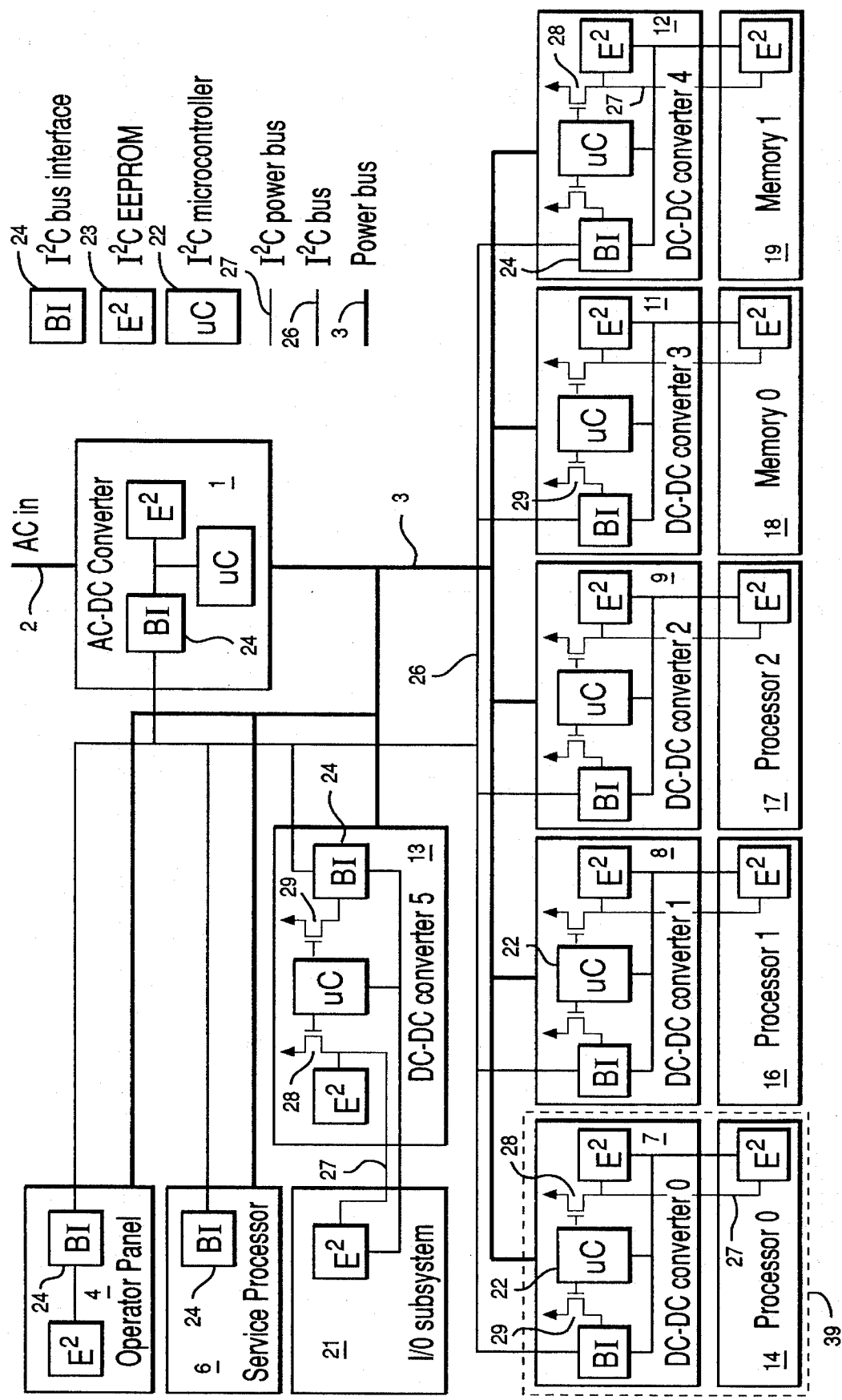
FIG. 1 is a schematic block diagram of a modular multiprocessor system with two EEPROM devices sharing each microcontroller.

FIG. 1 schematically depicts an embodiment of a multiprocessor system. AC-DC converter 1 converts an AC input voltage to a nominal level DC voltage on power bus 3. Intermediate level voltage on power bus 3 is provided to operator panel 4 and service processor 6. As depicted in FIG. 1, intermediate level voltage on power bus 3 also supplies a multiplicity of DC-DC converters, individually identified by reference numerals 7, 8, 9, 11, 12 and 13. Each such modular converter reduces the DC voltage from the intermediate level used for distribution down to the low level used for conventional high speed integrated circuit devices. For example, processor modules 14, 16 and 17 are respectively powered by converters 7, 8 and 9, while memory arrays 18 and 19 are respectively powered by converters 11 and 12. Similarly, I/O subsystem module 21 is powered by converter 13.

The modular nature of new multiprocessor designs require that there exist within the system knowledge as to the number and characteristics of replaced or additional modular elements. This is the information stored in the corresponding EEPROM devices, the E² blocks in FIG. 1 identified by reference numeral 23. For example, if DC-DC converter 8 fails the failure is detected by microcontroller 22 and disseminated throughout the system. Likewise, if memory module 19 and associated DC-DC converter module 12 are added to the system, that information must be disseminated throughout the multiprocessor system. A related situation arises when a processor, memory, I/O or DC-DC converter module is replaced, in that the configuration change information must be disseminated, as well as having the replacement module identity properly situated within the order of all the multiprocessor addresses.

In addition to the I²C bus protocol EEPROM devices 23 within the modules of the system, each DC-DC converter also has an I²C bus interface (BI) 24. Bus interfaces 24 are likewise industry standard devices for interfacing to I²C bus 26.

In FIG. 1, I²C power buses 27 are used to selectively enable and disable corresponding EEPROM devices 23. For this embodiment, each microcontroller 22 selectively enables or disables transistor 28, driving bus 27, to correspondingly enable or disable the operation of the respective pair of EEPROM devices.

The preferred embodiment depicted in FIG. 1 involves a multiprocessor system in which the modules, such as DC-DC converter module 7 and processor module 14, together form a single field replaceable unit 39. Each module has an EEPROM device storing module related vital product data. However, the pair of modules share microcontroller 22 and I²C bus interface 24.

The present invention eliminates the aforementioned constraint on the number of EEPROM devices accessible by the I2C bus because each controller 22 now individually manages access to the pair of EEPROM devices. Access to the pair of EEPROM devices is through the microcontroller using the 10 bit I²C bus protocol as interpreted by the intelligence of the microcontroller. For example, when the system controller wishes to access an EEPROM device, it transmits a 10 bit message over EEPROM bus 26. The microcontroller having the specified address recognizes its address and enables both EEPROM devices by powering transistor 28. Thereafter, the system controller reads or writes data to a selected one of the two EEPROM devices in conventional manner without regard to the multiplicity of other EEPROM device in the multiprocessor system modules. The other EEPROM devices are disabled by their corresponding microcontrollers. When the system controller is finished, it transmits another 10 bit message to the microcontroller to disable the specified pair of EEPROM devices.

The configuration of microcontroller addresses to uniquely identify a field replaceable unit, such as the aforementioned combination 39 of DC-DC converter 7 and processor 14, is accomplished during the system reset cycle. During this cycle, microcontroller 22 uses transistor 29 to disable interface 24, effectively isolate the EEPROMs from I²C bus 26, while accessing the corresponding EEPROMs to read the address to be used by the microcontroller for the unit pair. Once the address for the unit pair of modules is read from the EEPROMs, the EEPROMs are disabled and I²C bus interface 24 is enabled.

Selection between multiple EEPROM devices in a selected unit is by way of the earlier noted 3 bits. The EEPROM select addresses are hard wired to distinguish the EEPROM in DC-DC converter 7 from the one in processor Obviously, as the number of EEPROMs enabled by a single microcontroller increases, consistency must be maintained within the functions attributed to hardwired EEPROM select addresses. The net effect is to increase the number of EEPROM devices addressable over an I²C bus beyond the bus protocol limit of 8 through a shared use of the intelligence present in the microcontrollers.

Figure 2:
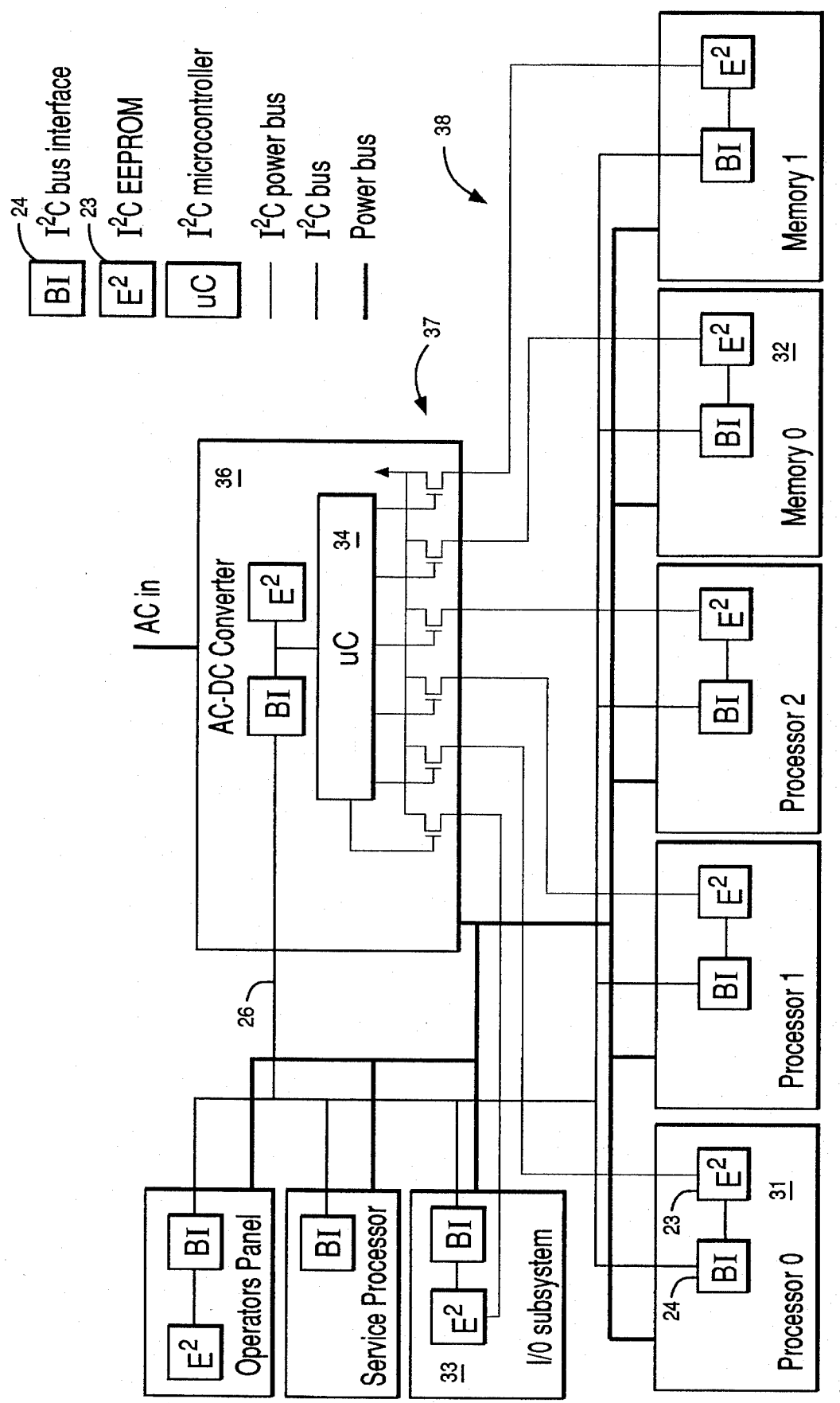
FIG. 2 is a schematic block diagram of a modular multiprocessor system in which six EEPROM devices share a microcontroller.

FIG. 2 depicts another embodiment of the invention. In this case, modules such as processor 31, memory 32 and I/O subsystem 33 do not have individual DC-DC converters, but rather are supplied from a source common to the whole of the multiprocessor system. Here the field replaceable units are the individual modules. Each module, such as processor module 31, includes EEPROM device 23, for storing the vital product information associated with that module, and I²C bus interface 24. In this embodiment, microcontroller 34 in master AC-DC converter 36 selectively enables through the appropriate one of the transistors 37 the EEPROM device identified by microcontroller 34 as having been selected by the 10 bit address I²C.

The embodiment in FIG. 2 requires one additional line to each module in the system over that required by the embodiment in FIG. 1. However, this embodiment obviates the need for a multiplicity of microcontrollers at the field replaceable unit level. In the case of FIG. 1, the microcontrollers were already available in the DCDC converters. Where multiple microcontrollers are not readily available, the architecture of FIG. 2 may be more cost efficient.

The embodiments in FIGS. 1 and 2 are merely illustrative of the ways the invention may be practiced. For example, it should be apparent that the I²C bus protocol permits each microcontroller to simultaneously enable up to eight EEPROM devices, and thus by the architecture select in arrays of eight modules having individual EEPROM devices. In the context of FIG. 1 embodiment, this would allow each microcontroller in a DC-DC converter to control access to the EEPROM devices of six modules analogous to processor module 14. The remaining two of eight EEPROM select addresses are used by the EEPROM in DC-DC converter 7 and the EE PROM in operator panel 4. The number of distinctly addressable microcontrollers in the architecture of FIG. 1 is constrained by the 10 bit address range of the I²C bus protocol for intelligent devices.

For the architecture in FIG. 2, the number of distinctly addressable EEPROM devices is directly related to the use of 10 bit I²C bus protocol words intelligible to microcontroller 34. The number of enabling transistors 37, and I²C power bus lines 38 are directly proportional.

Figure 3:
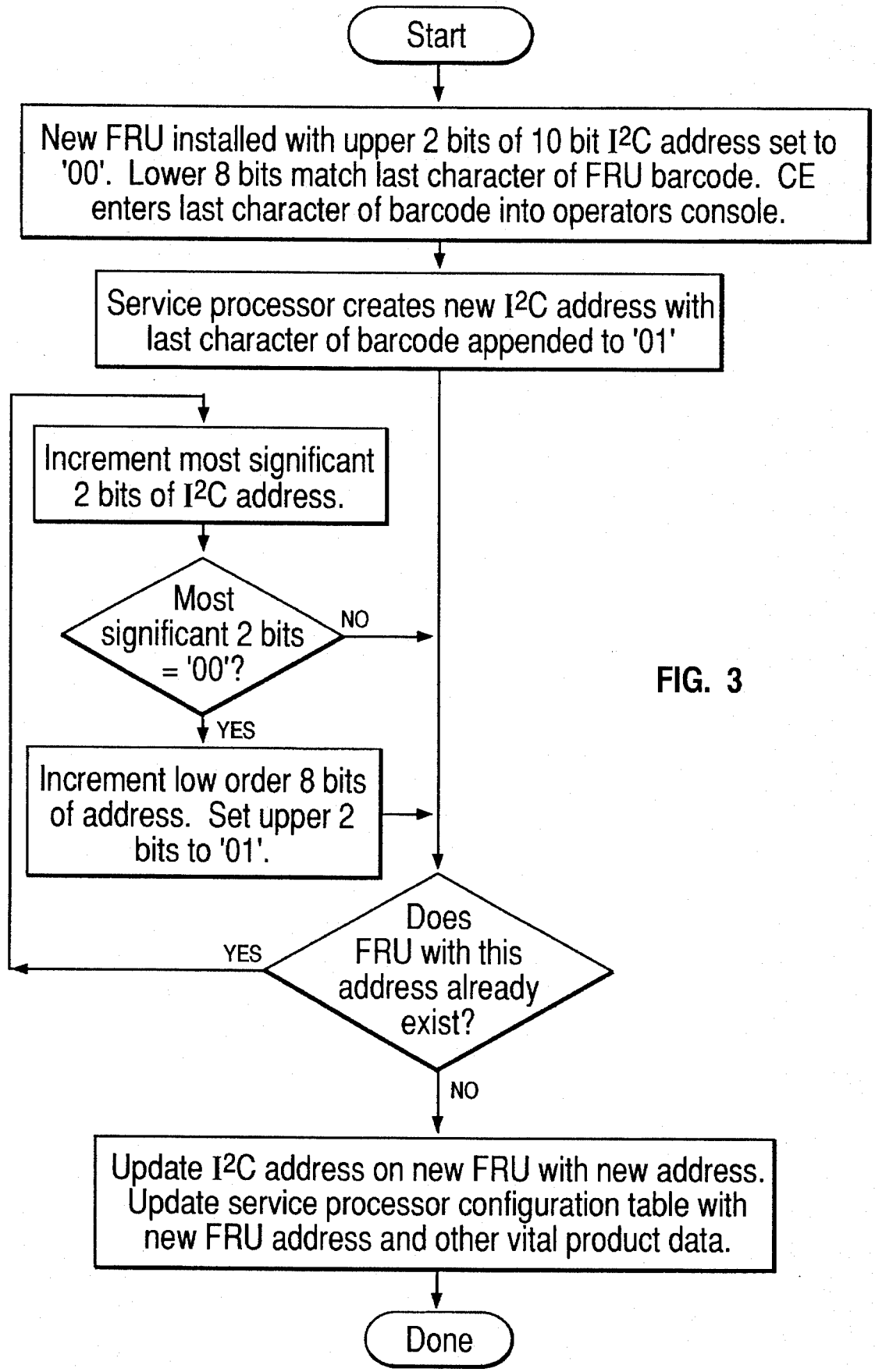
FIG. 3 is a flow chart setting of the initialization sequence for a modular multiprocessing system using the invention architecture.

FIG. 3 sets forth by flow chart a preferred procedure for setting up the EEPROM devices when one or more modules having such EEPROM devices are added or replaced in a multiprocessor system. In the context of FIG. 1, field replaceable units 39, composed of modules 7 and are shipped from the factory with the upper two bits of their 10 bit address set to binary 0. The lower 8 bits are defined by the least significant digits of the unit serial number. The unit serial number is chosen because it provides a user readable pseudo-random starting point for address selection. This combination of zeroes and serial number bits serves as the address until updated by the system controller.

When a new field replaceable unit is installed, the individual installing the unit enters the part serial number into the system through the system controller console, or through a software system management tool. The system controller creates a new 10 bit address, with the upper two bits set to binary 01 and the lower 8 bits retaining the original serial number of the new unit. An attempt is then made to access within the multiprocessor system a unit having this address. If there is no response, the system controller presumes the address is unique, accesses the EEPROM device using the original serial number and binary 00 combination, and then writes the newly defined combination of 01 and serial number into the EEPROM device to serve as the microcontroller address for future use. The unit address table in the system controller nonvolatile memory is also updated to reflect the fact that a new modular unit exists with the above noted address.

If, on the other end, the attempt to access a device using the combination of binary 01 with the part serial number shows a response, then the microcontroller address is already in use. In such case, the system controller sets the two bits to binary 10 and again tries accessing. If this also fails, a binary 11 is attempted. If this also fails, the system controller increments the 8 bit part serial number and repeats the process starting with the upper two bits set at binary 01. The sequence insures that a unique microcontroller address is eventually identified for each new unit. If multiple units are being installed, and for some unusual reason the digits corresponding to the eight least significant bits of the serial number in binary form are identical, the installation needs to be accomplished one unit at a time.

The installation procedure is depicted in the sequence of the operations and decisions represented by the flow chart in FIG. 3. The acronym FRU stands for field replaceable units while the acronym CE stands for customer engineer. The incremental adjustment and comparison of the addresses in pursuit of a unique unit address is evident in the recursive nature of the flow chart.

Though the invention has been described and illustrated by way of specific embodiments, the systems and methods encompassed should be interpreted in keeping with the breadth of the claims set forth hereinafter.

We claim:

1. In a modular computer, a system controlling access to memory devices in modules of the computer comprising:

a plurality of first modules connected to a control bus, the first modules each having a first addressable nonvolatile memory device storing data about the first module and a controller for enabling signal transmission between the first nonvolatile memory device and the control bus;

a plurality of second modules each related by function to respective first modules, the second modules each having a second addressable nonvolatile memory device storing data about the second module;

means for controllers in the first modules to enable signal transmission between second nonvolatile memory devices in related second modules and the control bus;

means for a selected controller to simultaneously enable signal transmission between the control bus and both first and second nonvolatile memory devices responsive to a single control message provided on the control bus and means for transmitting over the control bus; an address signal to both first and second nonvolatile memory devices to selectively accesses stored data about either the first or the second module based upon the content of the address signal.

2. The system recited in claim 1, wherein the nonvolatile memory devices store product characteristic data relating to corresponding modules.

3. The system recited in claim 2, wherein the control bus is a serial bus.

4. The system recited in claim 1, further comprising:

means for storing in a first nonvolatile memory device a computer system address attributable to both respective first and second modules.

5. The system recited in claim 4, wherein the number of distinct nonvolatile memory devices directly addressable from the control bus is lower than the number of second modules.

6. The system recited in claim 1, wherein the controller in a single first module enables signal transmissions between the control bus and second nonvolatile memory devices in multiple second modules.

7. The system recited in claim 6, wherein the nonvolatile memory devices store product characteristic data relating to corresponding modules.

8. The system recited in claim 7, wherein the control bus is a serial bus.

9. The system recited in claim 8, further comprising:

means for storing in a first nonvolatile memory device a modular computer address attributable to both respective first and second modules.

10. A method of controlling access to nonvolatile memory devices in a modular computer having a plurality of first modules connected to a control bus, the first modules each having a first addressable nonvolatile memory device storing data about the first module and a controller for enabling signal transmission between the first nonvolatile memory device and the control bus, a plurality of second modules each related by function to respective first modules, the second modules each having a second addressable nonvolatile memory device storing data about the second module, resources in the controller of the first modules to enable signal transmission between second nonvolatile memory devices in related second modules and the control bus, and resources for having a selected controller simultaneously enable signal transmission between the control bus and both first and second nonvolatile memory devices responsive to a single control message provided on the control bus, comprising the steps of:

communicating a single control message over the control bus to a selected controller in a first module;

enabling simultaneous addressable access from the control bus to both first and second nonvolatile memory devices in related first and second modules responsive to receipt of the control message by the controller in the first module; and transmitting over the control bus an address signal to both first and second nonvolatile memory devices to selectively access stored data about either the first or the second module based upon the content of the address signal.

11. The method recited in claim 10, wherein the enabling simultaneous addressable access step provides access to product characteristic data stored in the nonvolatile memory devices.

12. The method recited in claim 11, wherein the control bus is a serial bus.

13. The method recited in claim 12, further comprising the step of:

storing in a first nonvolatile memory device a computer system address attributable to both the respective first and second modules.

\* \* \* \* \*